(12) United States Patent
Takano

(10) Patent No.: US 9,282,583 B2
(45) Date of Patent: Mar. 8, 2016

(54) BASE STATION, WIRELESS COMMUNICATION METHOD, USER EQUIPMENT, AND WIRELESS COMMUNICATION SYSTEM

(75) Inventor: Hiroaki Takano, Saitama (JP)

(73) Assignee: Sony Corporation, Tokyo (JP)

( * ) Notice: Subject to any disclaimer, the term of this patent is extended or adjusted under 35 U.S.C. 154(b) by 632 days.

(21) Appl. No.: 13/641,752

(22) PCT Filed: May 19, 2011

(86) PCT No.: PCT/JP2011/002798
§ 371 (c)(1),
(2), (4) Date: Oct. 17, 2012

(87) PCT Pub. No.: WO2011/148599
PCT Pub. Date: Dec. 1, 2011

(65) Prior Publication Data
US 2013/0039253 A1    Feb. 14, 2013

(30) Foreign Application Priority Data

May 26, 2010  (JP) .................................. 2010-120635
Mar. 11, 2011  (JP) .................................. 2011-054709

(51) Int. Cl.
*H04W 76/02*       (2009.01)
*H04W 92/20*       (2009.01)

(52) U.S. Cl.
CPC ............ *H04W 76/023* (2013.01); *H04W 92/20* (2013.01)

(58) Field of Classification Search
CPC ............................ H04W 76/023; H04W 92/20
See application file for complete search history.

(56) References Cited

U.S. PATENT DOCUMENTS

2008/0165881 A1     7/2008  Tao et al.
2009/0135748 A1*   5/2009  Lindoff et al. ................ 370/296
2010/0195566 A1*   8/2010  Krishnamurthy et al. .... 370/328

FOREIGN PATENT DOCUMENTS

| JP | 2000-13870  | A |   | 1/2000  |
|----|-------------|---|---|---------|
| JP | 2001-358651 | A |   | 12/2001 |
| JP | 2002-335204 |   | * | 11/2002 |
| JP | 2002-335204 | A |   | 11/2002 |
| JP | 2003-333646 | A |   | 11/2003 |
| JP | 2006-174018 | A |   | 6/2006  |
| JP | 2009-527940 | A |   | 7/2009  |
| JP | 2009-544175 | A |   | 12/2009 |

OTHER PUBLICATIONS

"LI Delay Impact on ICIC in type 1 Relay", Huawei, 3GPP TSG RAN WG1 Meeting #57bis, R1-092376, Jun. 29-Jul. 3, 2009, 6 pages.*
Combined Office Action and Search Report issued Oct. 8, 2014 in Chinese Patent Application No. 201180024318.8 (with English translation).
International Search Report issued Jul. 12, 2011 in PCT/JP2011/002798.
"Service requirements for Home Node B (HNB) and Home eNode B (HeNB)", 3rd Generation Partnership Project; Technical Specification Group Services and System Aspects;, 3GPP TS 22.220, V9.4.0, Mar. 2010, 22 pages.
Office Action issued Aug. 12, 2014 in Japanese Patent Application No. 2011-057409.

* cited by examiner

*Primary Examiner* — Siming Liu
(74) *Attorney, Agent, or Firm* — Sony Corporation

(57) ABSTRACT

There is provided a base station including a communication unit for communicating with a user equipment according to a frame format where subframes for uplink and subframes for downlink are structured in a time division manner, and a scheduler for moving a boundary between a subframe for downlink and a subframe for uplink. The communication unit wirelessly communicates with another base station by using a subframe between the boundary before movement by the scheduler and the boundary after the movement.

27 Claims, 18 Drawing Sheets

FIG.5

| | #0 D | #1 S | #2 U | #3 U | #4 U | #5 D | #6 D | #7 D | #8 D | #9 D |
|---|---|---|---|---|---|---|---|---|---|---|
| Home eNodeB 30A | | | | | | | | | | |
| Home eNodeB 30B | #0 D | #1 S | #2 U | #3 U | #4 U | #5 D | #6 D | #7 D | #8 D | #9 D |
| Home eNodeB 30C | #0 D | #1 S | #2 U | #3 U | #4 U | #5 D | #6 D | #7 D | #8 D | #9 D | b1 (between #1 and #2), b2 (between #4 and #5)

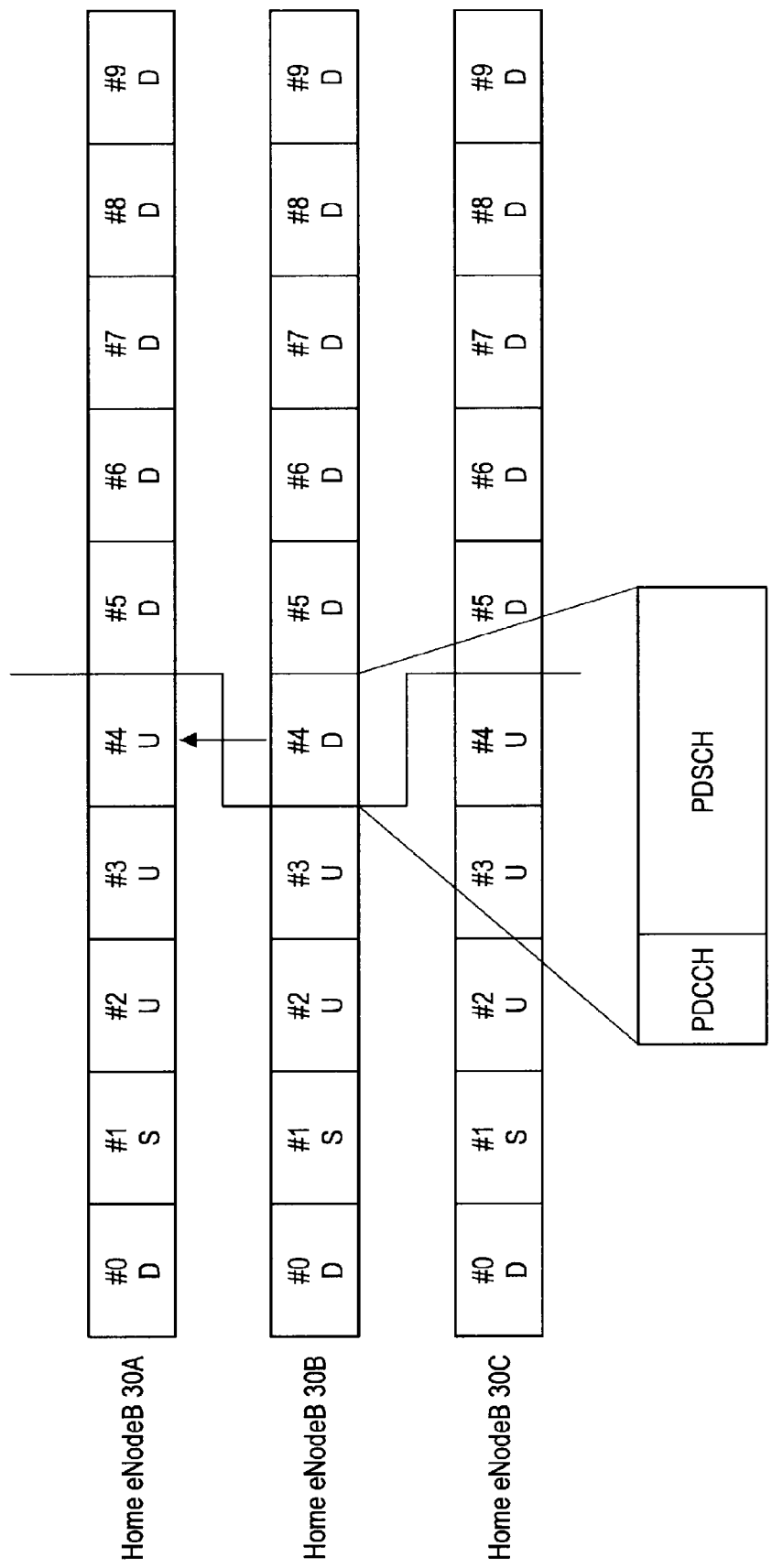

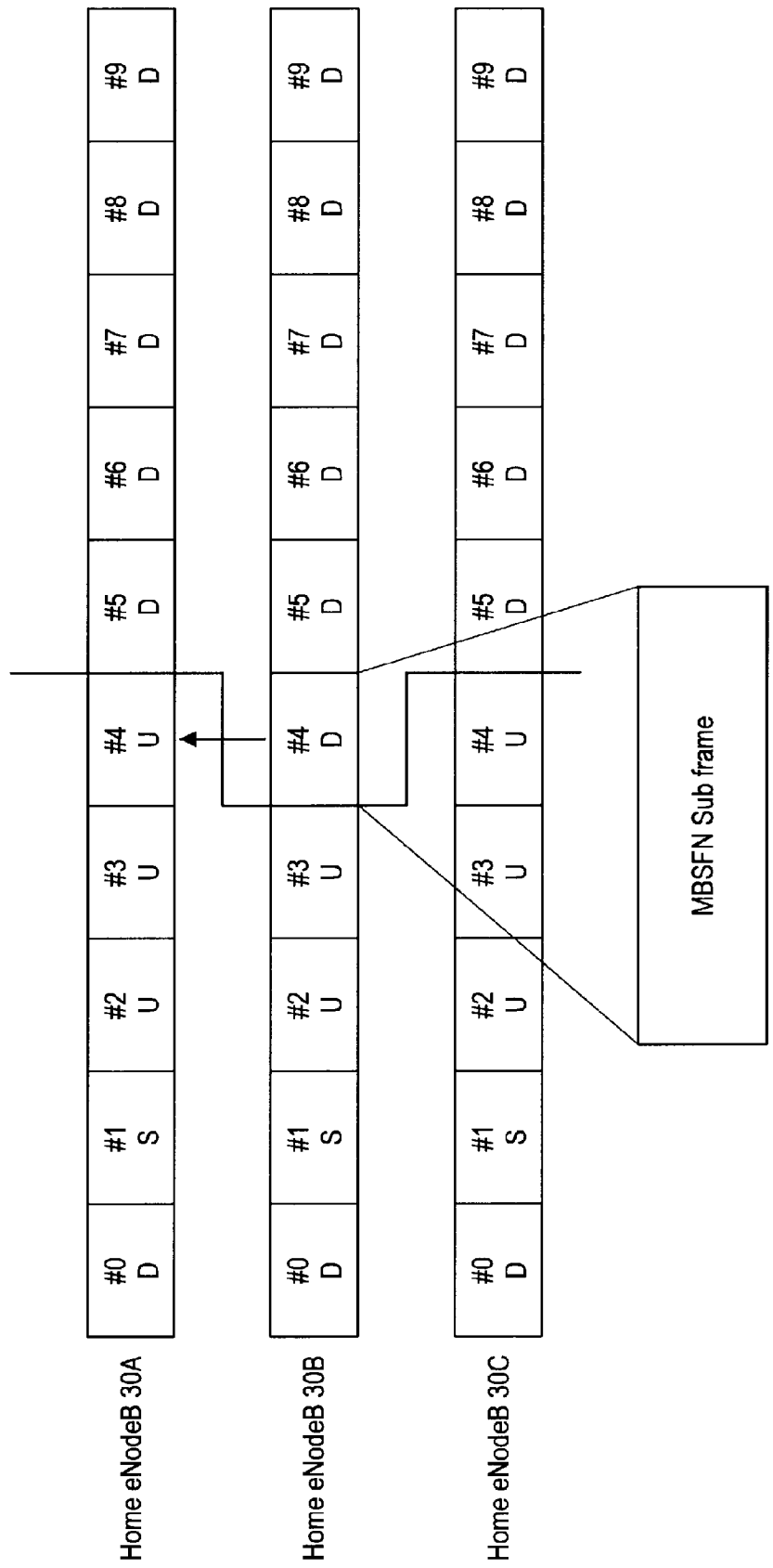

BASE STATION, WIRELESS COMMUNICATION METHOD, USER EQUIPMENT, AND WIRELESS COMMUNICATION SYSTEM

TECHNICAL FIELD

The present description relates to a base station, a wireless communication method, a user equipment, and a wireless communication system.

BACKGROUND ART

Presently, standardization of a 4G wireless communication system is being developed in the 3GPP (Third Generation Partnership Project). According to the 4G efforts, improvement in a maximum communication rate and improvement in quality at a cell edge can be realized by using a technology such as relaying or carrier aggregation. Also, improving coverage by introducing a base station other than an eNodeB (macrocell base stations), such as a HeNB (which may also be referred to as a HeNodeB, a Home eNodeB, a femtocell base station, a small mobile phone base station, or the like; hereinafter, referred to as HeNodeB), a RRH (Remote Radio Head), or the like, is also being considered.

Furthermore, each eNodeB is provided with an X2 interface, and each eNodeB can communicate directly with another eNodeB via the X2 interface. Accordingly, each eNodeB can exchange information for Inter Cell Interference Coordination (ICIC), for example, with another eNodeB via the X2 interface.

Also, the HeNodeB is a small base station installed at home. Owing to the installation of the HeNodeB, a user equipment is enabled to communicate with the HeNodeB even within home where the radio wave of the eNodeB is weak. Furthermore, owing to the installation of the HeNodeB, an effect of reducing the load on the eNodeB can be expected, and thus the HeNodeB is ranked in the 4G as an important node.

Additionally, an FDD (Frequency Division Duplex) mode and a TDD (Time Division Duplex) mode are provided in the 4G. The TDD mode is a method for setting each of ten subframes forming one frame for uplink use or for downlink use. This TDD mode is described in Patent Literature 1, for example.

CITATION LIST

Patent Literature

PTL 1: JP-A-2000-13870

SUMMARY OF INVENTION

Technical Problem

However, the X2 interface is not provided to the HeNodeB described above. This is because the HeNodeB is connected to an Internet line at home and it is difficult to meet a predetermined quality regarding delay or the like necessary for the X2 interface. Thus, there was an issue that the HeNodeB was not allowed to directly communicate with another HeNodeB.

In light of the foregoing, it is desirable to provide a base station, a wireless communication method, a user equipment, a non-transitory computer program storage device, and a wireless communication system which are novel and improved, and which are capable of realizing wireless communication between base stations such as the HeNodeBs.

Solution to Problem

According to an embodiment, a two-way wireless communication node includes
a transceiver configured to communicate with a user equipment but not another two-way wireless communications node using uplink and downlink subframes according to a predetermined frame format that uses a time division arrangement; and
a processor configured to change a status of a subframe in the predetermined frame format to enable direct communications with another two-way wireless communication node while retaining a frame format used by the another two-way wireless communication node.

One aspect of the node is that the processor includes a scheduler that changes the status of the subframe, and
the status being changed from an uplink subframe to a downlink subframe.

Another aspect of the nodes is that the downlink subframe being a subframe that directly follows in time another uplink subframe, and
the another uplink subframe having a same status as originally assigned in the predetermined frame format.

Another aspect is that the scheduler determines whether there is X2 data to be sent; and
the another two-way wireless communications node reserves at least one resource block in the subframe having the change in status.

Another aspect is that the processor changes the status of the subframe when the scheduler determines that there is X2 data to be sent; and
the transceiver transmits the X2 data in the at least one resource block of the subframe.

Another aspect is that the subframe includes information regarding base station interference coordination information.

A further aspect is that the processor changes the status to be consistent with a change in status for a corresponding subframe made by a third two-way wireless communication node.

The user equipment may also designate the subframe as a Multicast/Broadcast Single Frequency Network subframe.

While the above features have been described from the perspective of a communication node, they are similarly relevant for a method, UE, and non-transitory computer storage device.

Advantageous Effects of Invention

As described above, wireless communication between base stations such as HeNodeBs can be realized.

BRIEF DESCRIPTION OF DRAWINGS

FIG. 5 is an explanatory diagram showing TDD frames of a case where three HeNodeBs are normally operating.

FIG. 17 is an explanatory diagram showing a configuration of a subframe.

FIG. 18 is an explanatory diagram showing a third embodiment.

DESCRIPTION OF EMBODIMENTS

Figure 1:
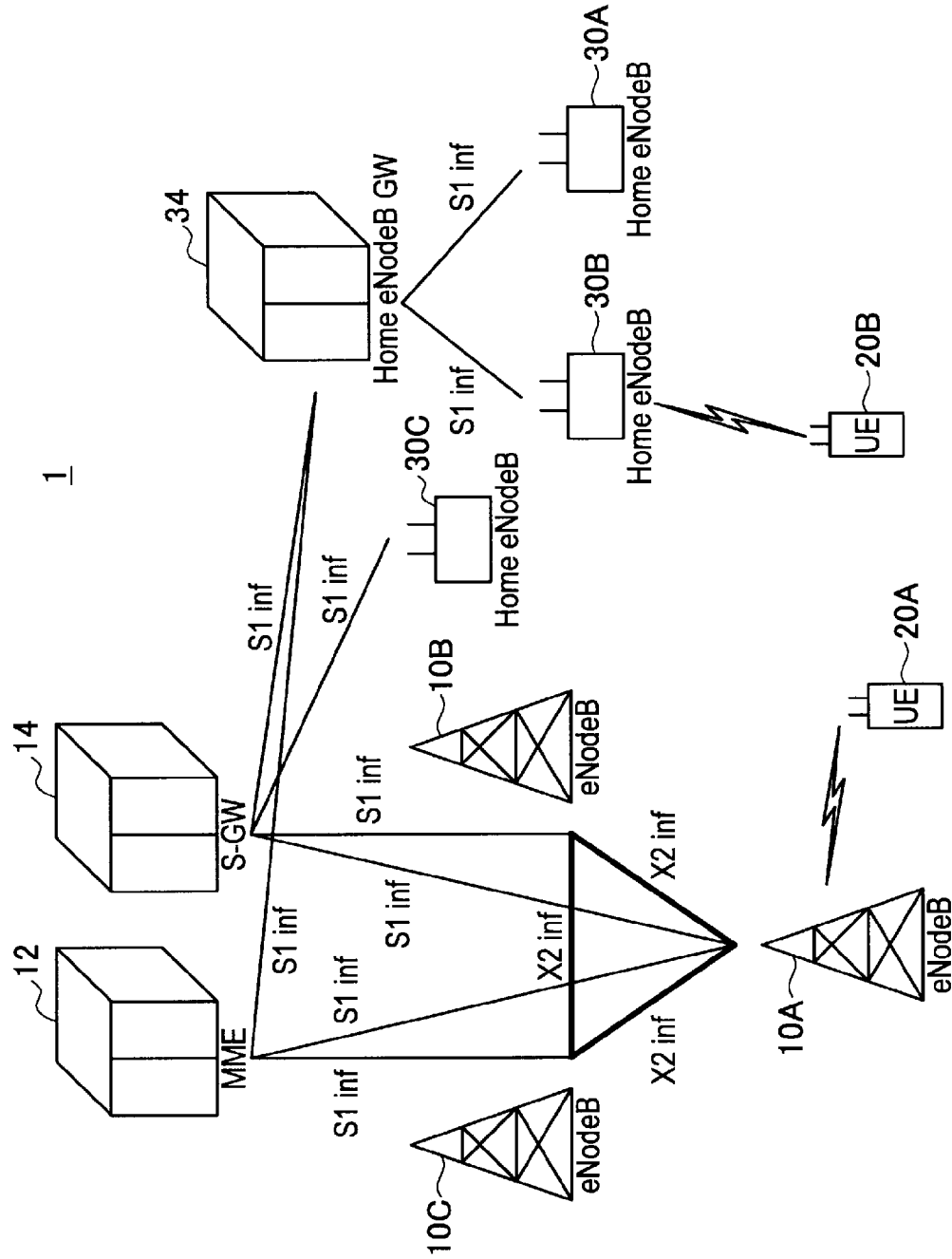
FIG. 1 is an explanatory diagram showing an example configuration of a wireless communication system according to 4G.

Hereinafter, preferred embodiments will be described in detail with reference to the appended drawings. Note that, in this specification and the appended drawings, structural elements that have substantially the same function and structure are denoted with the same reference numerals, and repeated explanation of these structural elements is omitted.

Also, in this specification and the drawings, a plurality of structural elements having substantially the same functional configuration may be distinguished from each other by each having a different letter added to the same reference numeral. For example, a plurality of elements having substantially the same functional configuration are distinguished from each other as necessary as HeNodeBs 30A, 30B, and 30C. However, if it is not particularly necessary to distinguish each of a plurality of structural elements having substantially the same functional configuration, only the same reference numeral is assigned. For example, if it is not particularly necessary to distinguish between the HeNodeBs 30A, 30B, and 30C, they are simply referred to as the HeNodeBs 30. HeNodeBs 30 are "two way" communication nodes, meaning that they are able to transmit and receive wireless communications.

Additionally, "Description of Embodiments" will be described in the item order below.

1. Overview of 4G
1-1. System Configuration of 4G
1-2. Frame Format According to 4G
1-3. X2 Interface
2. Circumstances Leading to an Embodiment
3. First Embodiment
3-1. Configuration of HeNodeB
3-2. Operation of HeNodeB
3-3. Supplement to First Embodiment
4. Second Embodiment
4-1. Configuration of User Equipment
4-2. Operation of User Equipment
5. Third Embodiment
6. Summary <1. Overview of 4G>

Presently, standardization of a 4G wireless communication system is being developed in 3GPP. An embodiment can be applied to this 4G wireless communication system, for example, and thus an overview of the 4G wireless communication system will be described first.

<1-1. System Configuration of 4G>

FIG. 1 is an explanatory diagram showing an example configuration of a wireless communication system 1 according to the 4G system. As shown in FIG. 1, the wireless communication system 1 includes eNodeBs 10A to 10C, a MME (Mobility Management Entity) 12, a S-GW (Serving Gateway) 14, UEs (User Equipments) 20A and 20B, HeNodeBs 30A to 30C, and a HeNodeB-GW 34.

Each eNodeB 10 (i.e., 10A, 10B and 10C in FIG. 1) is a wireless base station that communicates with the user equipment 20. For example, the eNodeB 10A accommodates the user equipment 20A, schedules communication with the user equipment 20A, and performs wireless communication with the user equipment 20A based on the schedule. Optionally, the UE 20B, for example, may serve as a HeNodeB that provides a tethering service for another device that may only have close range wireless connectively to the UE 20B. To provide this tethering service, the UE 20B would include the hardware, firmware and software functionality of the HeNodeB, as discussed herein. Furthermore, each eNodeB 10 is provided with an X2 interface, and can exchange information via the X2 interface. The information to be exchanged via the X2 interface will be described in detail in "1-3. X2 Interface."

The MME 12 is a device that performs control of setting, releasing and handing over of a session for data communication. This MME 12 is directly connected to the eNodeB 10 and the HeNodeB-GW 34 via S1 interfaces.

The S-GW 14 is a device that performs routing, transfer, and the like, of user data. This S-GW 14 is directly connected to the eNodeB 10 and the HeNodeB-GW 34 via S1 interfaces.

The user equipment 20 is equipment that is used mainly by a user, and it communicates with a base station such as the eNodeB 10 or the HeNodeB 30. For example, the user equipment 20 corresponds to a mobile phone, but the user equipment 20 is not limited to a mobile phone. For example, the user equipment 20 may also be an information processing apparatus, such as a personal computer (PC), a home video processing apparatus (such as a DVD recorder or a video cassette recorder), a personal digital assistant (PDA), a home game machine, or a home appliance. Furthermore, the user equipment 20 may also be an information processing apparatus such as a personal handyphone system (PHS), a portable music playback device, a portable video processing device, a portable game machine, or the like.

The HeNodeB 30 is a small base station that is installed at home. Owing to the installation of this HeNodeB 30, the user equipment 20 is enabled to communicate with the HeNodeB 30 even within home where the radio wave of the eNodeB 10 is weak. Furthermore, the HeNodeB 30 is connected to the S-GW 14 or the HeNodeB-GW 34 via an S1 interface.

The HeNodeB-GW 34 is connected to the HeNodeB 30 via the S1 interface, and is a device that performs routing, transfer, and the like, of communication data of the HeNodeB 30.

Additionally, although the eNodeB 10 and the HeNodeB 30 are shown in FIG. 1 as examples of a base station, other nodes are also proposed in 4G. For example, introduction of base stations such as a relay node relaying communication between the user equipment 20 and the eNodeB 10, a RRH (Remote Radio Head), and the like are also proposed. The embodiment can be applied to any of these base stations. More specifically, embodiments related to communication between the HeNodeBs 30 and communication between the user equipment(s) 20 will be described in the following passages, but these embodiments are also applicable to communication between eNodeBs 10 and communication between eNodeBs 10 and the HeNodeB 30.

<1-2. Frame Format According to 4G>

An FDD (Frequency Division Duplex) mode and a TDD (Time Division Duplex) mode are provided in the 4G. In the following, a frame format according to the TDD mode which is highly related to the embodiment will be described.

Figure 2:
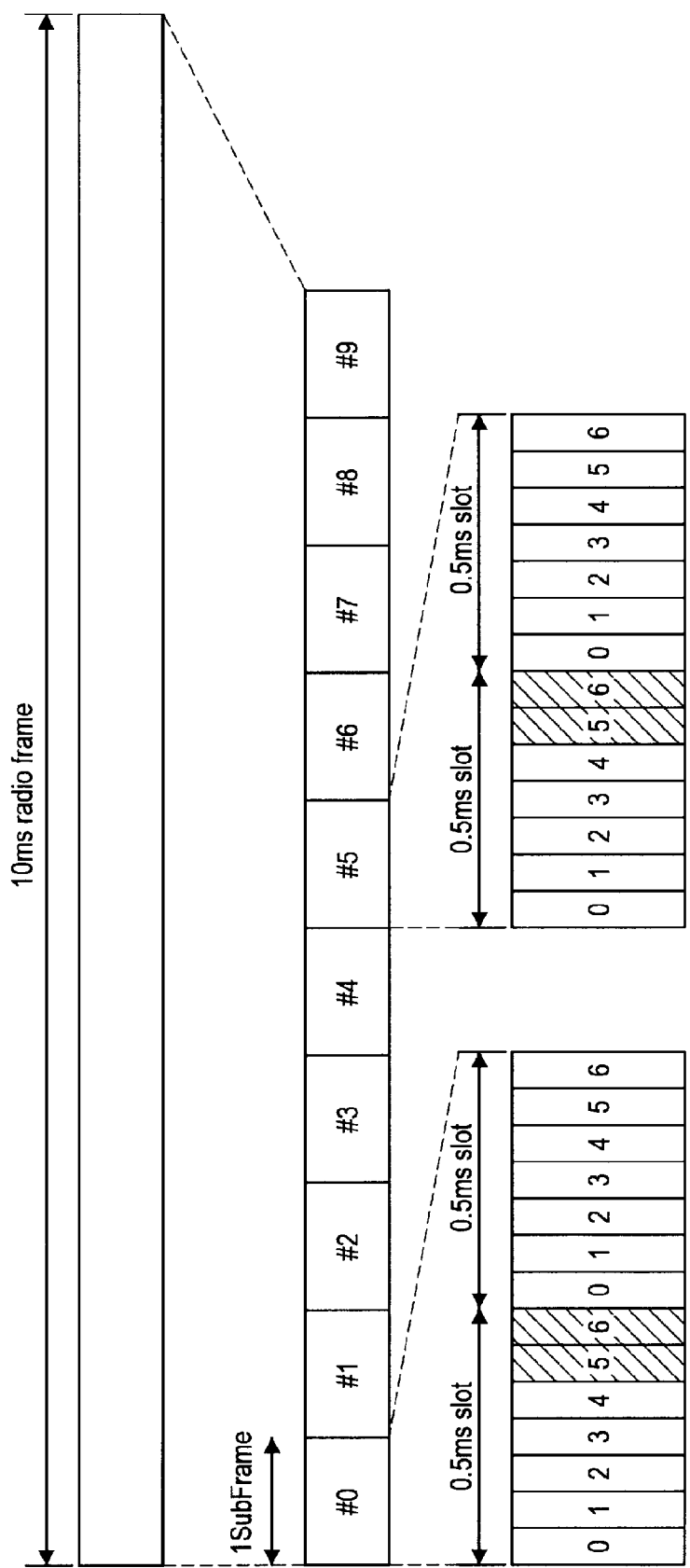
FIG. 2 is an explanatory diagram showing a frame format of 4G.

FIG. 2 is an explanatory diagram showing a frame format of the 4G. As shown in FIG. 2, a radio frame of 10 ms is formed from ten 1-ms subframes #0 to #9. Also, each 1-ms subframe is formed from two 0.5-ms slots. Furthermore, each 0.5-ms slot includes seven OFDM symbols.

The TDD is a method for differentially using each of the ten subframes shown in FIG. 2 as a subframe for uplink (from user equipment to base station) or a subframe for downlink (from base station to user equipment). However, since subframes for frame synchronization are inserted at subframes #0 and #5 which are positions shown with diagonal lines in FIG. 2, subframes #0 and #5 are fixedly used as subframes for downlink. Subframes other than subframes #0 and #5 can be used for uplink or downlink.

Additionally, it is assumed that allocation for the uplink and the downlink of the TDDs is basically the same for adjacent base stations. This is because the same subframes of adjacent base stations being different by one being for uplink use and the other being for downlink use is not desirable from the standpoint of interference coordination. However, as the standard, allocation for the uplink and the downlink of the base stations does not have to be completely the same.

Figure 3:
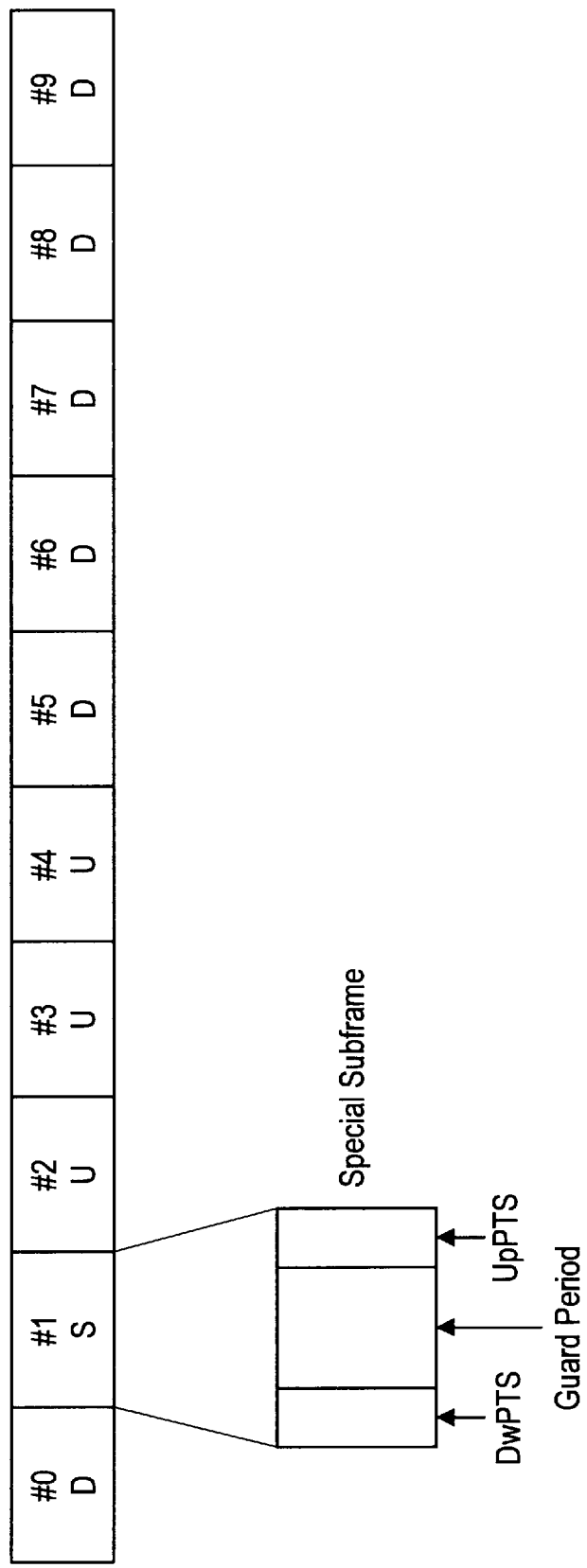
FIG. 3 is an explanatory diagram showing an example configuration of a TDD frame.

FIG. 3 is an explanatory diagram showing an example configuration of a TDD frame. In the example shown in FIG. 3, subframes #0 and #5 to #9 are set for downlink use, and subframes #2 to #4 are set for uplink use. Also, as shown in FIG. 3, a special subframe is inserted between a subframe for downlink and a subframe for uplink (subframe #1).

This special subframe is a guard period for a switching time of RF between uplink and downlink and a signal transmission delay time according to a distance between the base station and the user equipment 20, and is concentrated at the position of switching from downlink to uplink.

Specifically, the special subframe is formed from a DwPTS (Downlink Pilot Timeslot), the guard period, and a UpPTS (Uplink Pilot Timeslot). The DwPTS is set according to the user equipment 20 for which reception completion is the last due to delay among the user equipments receiving downlink data from the base station.

Also, the UpPTS is set according to the user equipment for which time from transmission of uplink data to reception by the base station is the longest among the user equipments transmitting uplink data to the base station.

That is, the user equipment for which the time from transmission of uplink data to reception by the base station is the longest starts transmission of the uplink data earlier by the UpPTS time than the start timing of subframe #2. Furthermore, each user equipment 20 completes within the DwPTS time reception of downlink data transmitted from the base station at subframe #0. Therefore, the special subframe is necessary in the case of switching from downlink to uplink to provide a relatively long guard period, but in the case of switching from uplink to downlink, since a relatively long guard period is not necessary, the special subframe is not necessary. Additionally, in 4G, the guard period itself is necessary also in the case of switching from uplink to downlink, but since it is a short guard period, illustration thereof in the drawing will be omitted in the frame configuration example of the present application.

As described, with the TDD frame of the 4G, the special subframe is inserted only at the time of switching from the subframe for downlink to the subframe for uplink, from the user equipment's point of view.

<1-3. X2 Interface>

As the uses of the X2 interface between the eNodeBs described above with reference to FIG. 1, the following examples can be cited.

(1) ICIC, That is, Coordination for Interference Suppression Between eNodeBs

The eNodeB performs ICIC by communicating, via the X2 interface, information such as an OI (Overload Indicator) indicating the degree of overload of a cell, a High Interference Indicator indicating the degree of interference from another cell, Relative Narrowband Tx Power indicating the transmission power of a counterpart base station, or the like.

Additionally, the High Interference Indicator is obtained by measurement at the eNodeB 10, and the Relative Narrowband Tx Power is obtained by the measurement of RSRP/RSSI at the user equipment 20.

(2) Seamless Handover

A serving eNodeB 10 before handover realizes seamless handover by transferring data and control information to a target eNodeB 10 after handover via the X2 interface.

(3) CoMP (Coordinated Multipoint) Transmission

CoMP transmission is performed by communicating transmission/reception data or scheduling information between adjacent eNodeBs 10 via the X2 interface. Additionally, in the case of performing CoMP transmission in the downlink, transmission data is shared between the adjacent eNodeBs 10 as bit data. Also, in the case of performing CoMP transmission in the downlink, a transmission weight may be shared between the adjacent eNodeBs 10. On the other hand, in the case of performing CoMP transmission in the uplink, a case where reception data is shared between the adjacent eNodeBs 10 as soft bit, a method of sharing the same as decoded bit data, and the like, are conceivable.

<2. Circumstances Leading to an Exemplary Embodiment>

For the aims described in "1-3. X2 Interface" described above, it is important that the X2 interface is capable of transmitting large data with low latency. On the other hand, the X2 interface is not provided in the HeNodeB 30. This is because the HeNodeB is connected to an Internet line at home and it is difficult to meet a quality regarding delay or the like necessary for the X2 interface.

Thus, there was an issue that it was difficult to realize the ICIC and the CoMP transmission described above due to the HeNodeB 30 not being able to directly communicate with the adjacent HeNodeB 30. Also, the user equipment 20 was also not allowed to perform P2P communication with another user equipment 20 using the frame format according to the 4G.

Accordingly, the embodiment has come to be made from the standpoint of the circumstances described above. According to a first embodiment, base stations such as the HeNodeBs 30 can wirelessly and directly communicate with each other. Furthermore, according to a second embodiment, the user equipments 20 can wirelessly and directly communicate with each other. In the following, such first and second embodiments will be described in detail.

<3. First Embodiment>

The first embodiment is for base stations such as the HeNodeBs 30 to wirelessly exchange X2 data (information for various uses described in "1-3. X2 Interface") by using predetermined resources. Additionally, in the following, explanation will be given placing emphasis on the HeNodeB 30 as an example of the base station, but the first embodiment is also applicable to other base stations such as the relay node, the eNodeB 10, the RRH and the like.

<3-1. Configuration of HeNodeB>

Figure 4:
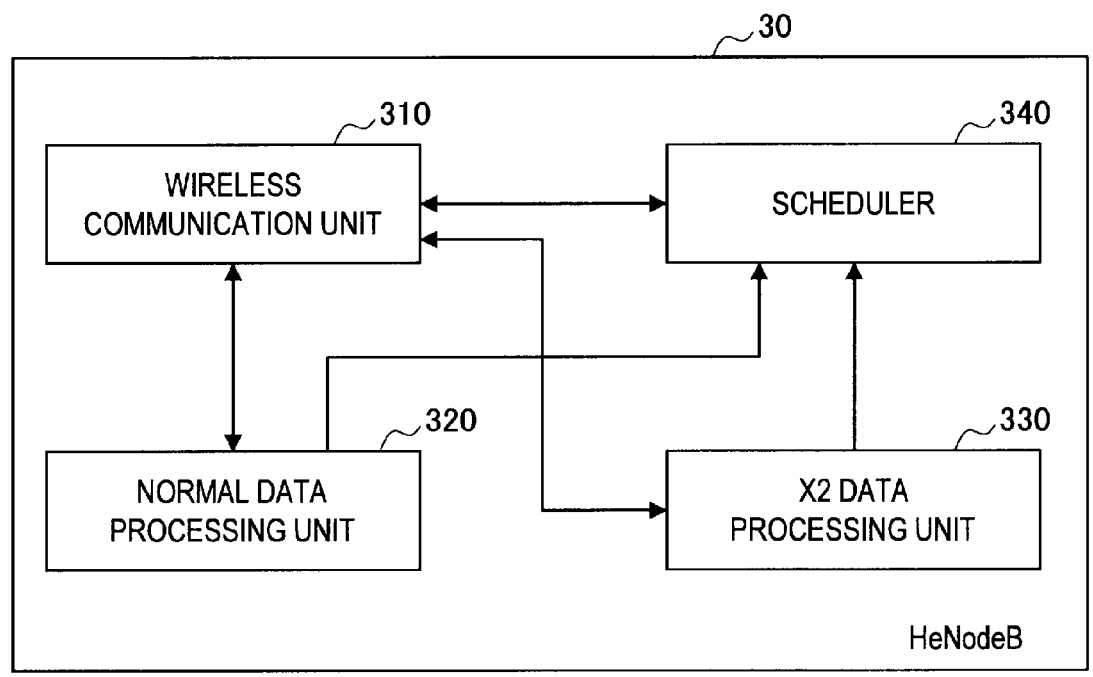
FIG. 4 is a function block diagram showing a configuration of an HeNodeB according to a first embodiment.

FIG. 4 is a function block diagram showing a configuration of the HeNodeB 30 according to the first embodiment. As shown in FIG. 4, the HeNodeB 30 includes a wireless communication unit 310, a normal data processing unit 320, an X2 data processing unit 330, and a scheduler 340. Additionally, although not shown in FIG. 4, the HeNodeB 30 also includes an S1 interface for communicating with the HeNodeB-GW 34 and the like.

The wireless communication unit 310 has a function as a transmission unit for transmitting a control signal and data to the user equipment 20, and as a reception unit for receiving a control signal and data from the user equipment 20. Furthermore, the wireless communication unit 310 according to the embodiment wirelessly exchanges, with the HeNodeB 30 in the vicinity, X2 data such as information for ICIC or information for CoMP transmission by using resources assigned by the scheduler 340.

The normal data processing unit 320 processes communication data of the user equipment 20. For example, the normal data processing unit 320 transfers, via the S1 interface, data received from the user equipment 20 by the wireless communication unit 310. The X2 data processing unit 330 performs collection of X2 data to be exchanged with another HeNodeB 30, processing based on X2 data obtained from another HeNodeB 30, and the like.

(Scheduling)

The scheduler 340 schedules, on the TDD frame, resources for exchange of normal data with the user equipment 20 or for exchange of the X2 data with another HeNodeB 30. In the following, scheduling by the scheduler 340 will be described in detail.

FIG. 5 is an explanatory diagram showing TDD frames of a case where three HeNodeBs are normally operating. As shown in FIG. 5, the HeNodeBs 30A to 30C operating in a normal operation state use subframes #2 to #4 as subframes for uplink and subframes #5 to #9 as subframes for downlink.

Here, consideration will be given on which subframe is appropriate as the resource for the HeNodeBs 30 to communicate X2 data with each other. First, for the HeNodeBs 30 to communicate the X2 data with each other, one HeNodeB 30 has to have a subframe set to uplink use (reception side) and the other has to have the same subframe set to downlink use (transmission side). That is, a HeNodeB 30 among a plurality of HeNodeBs 30 exchanging the X2 data has to change a subframe from uplink use to downlink use or from downlink use to uplink use.

However, the number of inserted special subframes increases as the number of times of switching between downlink and uplink in one frame increases, and communication efficiency is reduced. For example, for the HeNodeB 30B to change subframe #7 to uplink use and receive the X2 data from the HeNodeB 30A, the special subframe has to be inserted in subframe #6 of the HeNodeB 30B, and thus communication efficiency is reduced.

Accordingly, it is appropriate to change a subframe from uplink use to downlink use or from downlink use to uplink use by moving the boundary between a subframe for uplink and a subframe for downlink. Here, although it is also possible to move boundary b1 which is from a subframe for downlink to a subframe for uplink, since the special subframe is inserted at boundary b1 from a subframe for downlink to a subframe for uplink, it is particularly appropriate to move boundary b2 which is from a subframe for uplink to a subframe for downlink.

Figure 6:
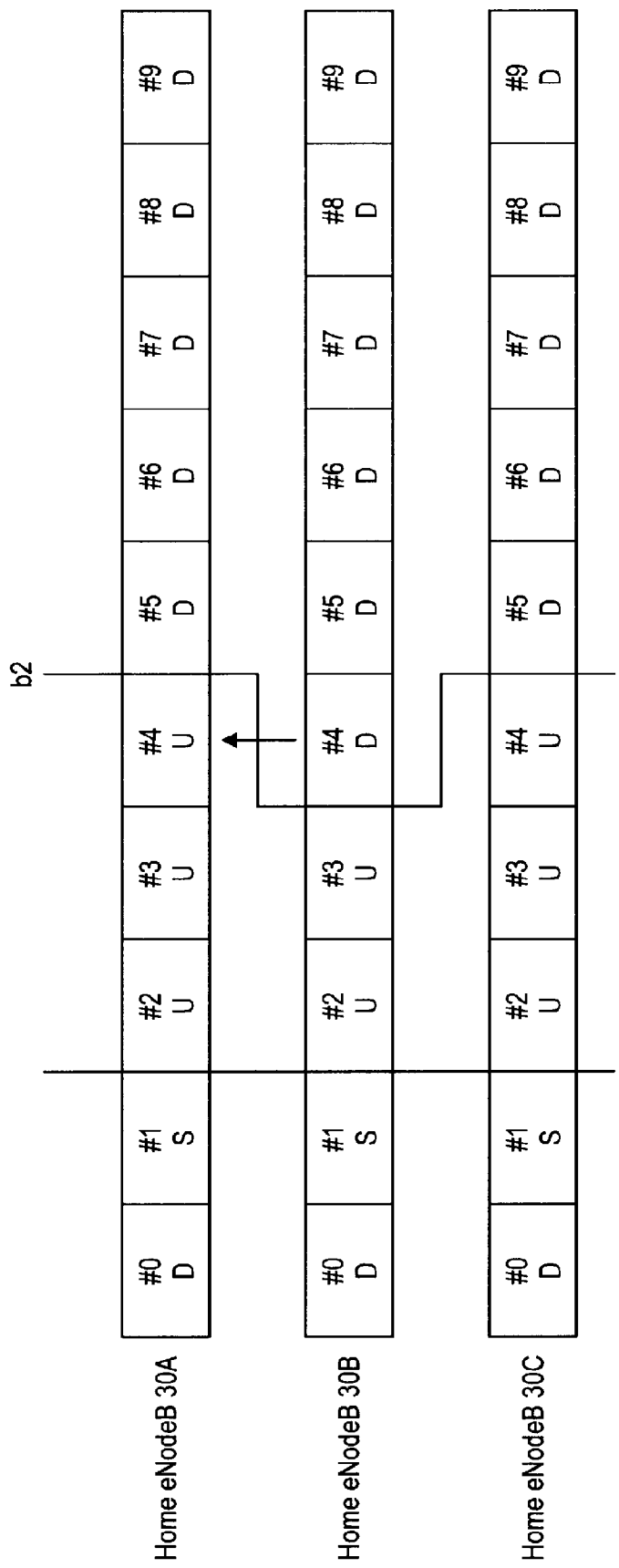
FIG. 6 is an explanatory diagram showing a TDD frame after change.

Specifically, as shown in FIG. 6, the scheduler 340 of the HeNodeB 30B that transmits the X2 data to the HeNodeB 30A changes subframe #4 to a subframe for downlink by moving boundary b2 in the forward direction along the time axis. This enables the HeNodeB 30B to wirelessly transmit the X2 data in subframe #4 and the HeNodeB 30A to receive the X2 data transmitted in subframe #4 from the HeNodeB 30B.

However, a case is also conceivable where the HeNodeB 30 which is the reception side is not capable of perceiving when the X2 data will be transmitted from another HeNodeB 30. Thus, as will be described with reference to FIG. 7, each HeNodeB 30 reserves a resource block for X2 data communication in advance.

Figure 7:
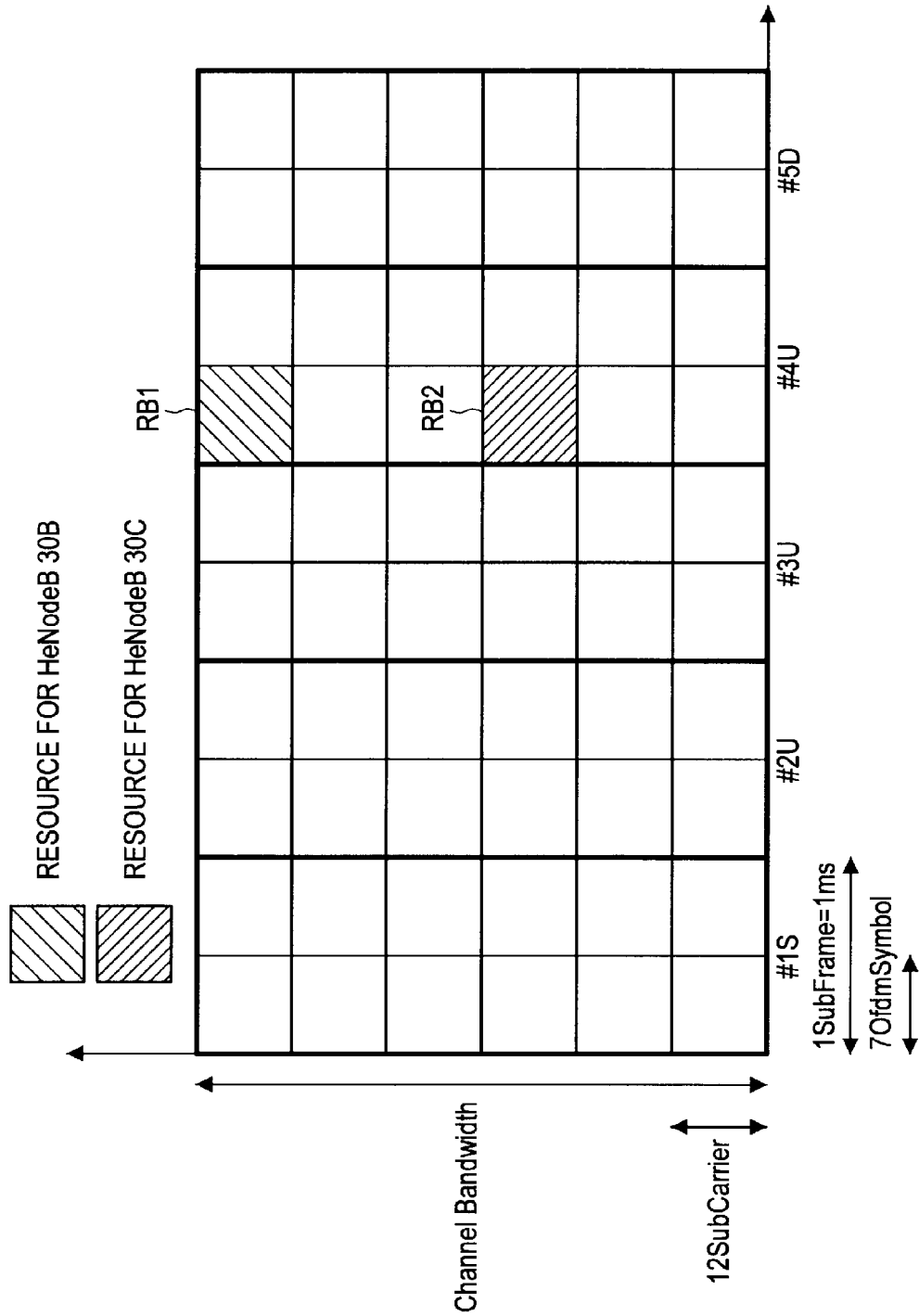
FIG. 7 is an explanatory diagram showing a detailed configuration of a subframe of the HeNodeB.

FIG. 7 is an explanatory diagram showing a detailed configuration of a subframe of the HeNodeB 30A. As shown in FIG. 7, resource blocks each including 12 subcarriers 7 OFDM symbols are laid in a grid pattern for each subframe. The scheduler 340 can assign resources for the user equipment 20 or for communication of the X2 data on per-resource block basis.

Therefore, in a normal operation, a resource block to which X2 data is possibly transmitted from another HeNodeB 30 is reserved by the scheduler 340 of the HeNodeB 30A. For example, as shown in FIG. 7, resource block RB1 in subframe #4 is reserved as a resource for X2 communication with the HeNodeB 30B by the scheduler 340 of the HeNodeB 30A. Also, resource block RB2 in subframe #4 is reserved as a resource for X2 communication with the HeNodeB 30C by the scheduler 340 of the HeNodeB 30A. Additionally, other resource blocks are used for normal data communication.

Figure 8:
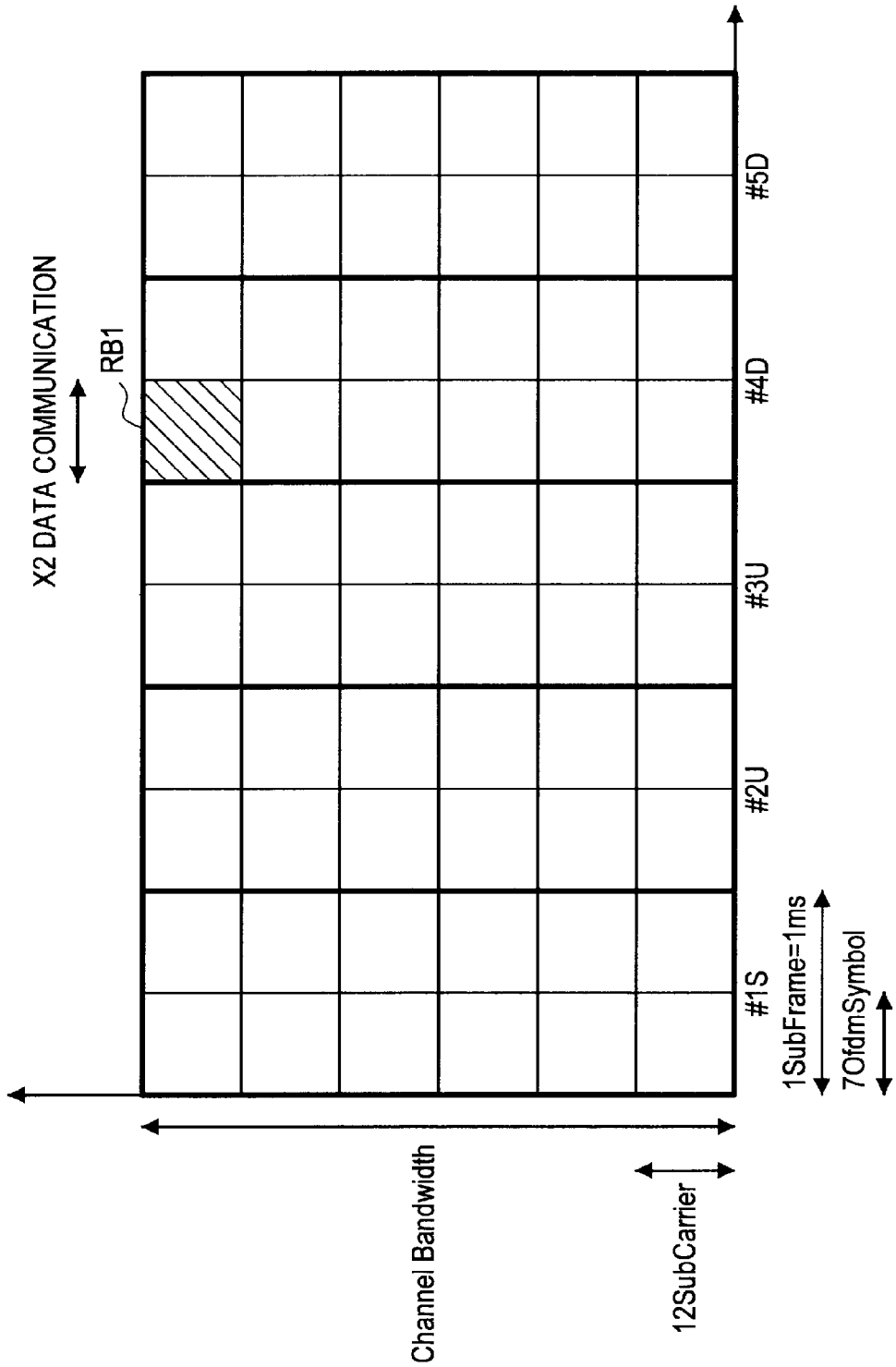
FIG. 8 is an explanatory diagram showing a resource block for transmitting X2 data.

Then, as shown in FIG. 8, at the time of transmitting X2 data to the HeNodeB 30A, the HeNodeB 30B transmits the X2 data by using resource block RB1 which is reserved, by the HeNodeB 30A, as the resource for communication of X2 data.

Additionally, in a normal operation, resource block RB1 is reserved by the HeNodeB 30B as a resource for X2 communication with the HeNodeB 30A, and resource block RB2 is reserved by the HeNodeB 30B as a resource for X2 communication with the HeNodeB 30C. Accordingly, in the case the HeNodeB 30A changes subframe #4 to downlink use and transmits X2 data in resource block RB1, the HeNodeB 30B can receive normally the X2 data transmitted from the HeNodeB 30A.

Modified Example 1

Figure 9:
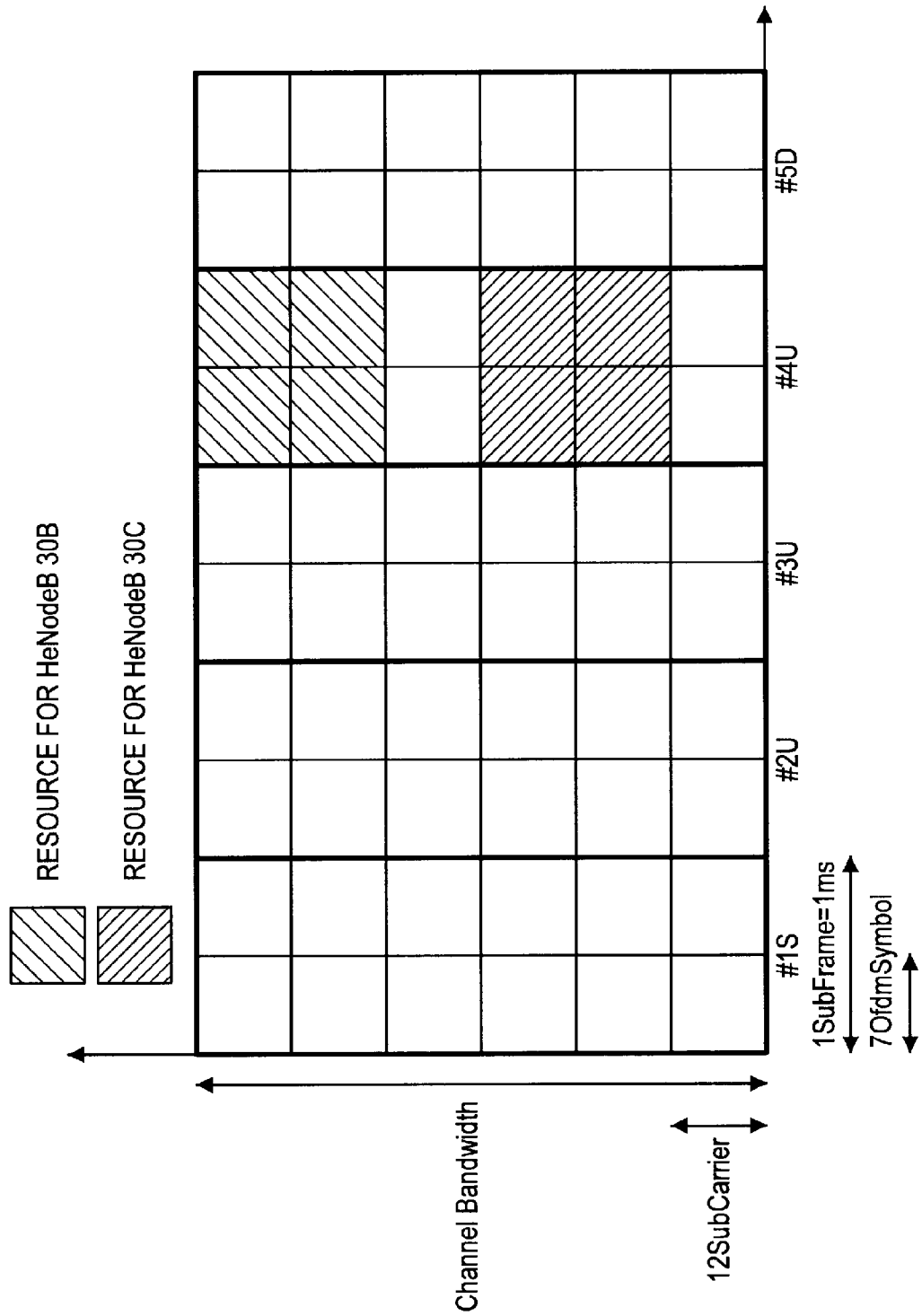
FIG. 9 is an explanatory diagram showing a modified example of a frame configuration of the HeNodeB.

Furthermore, an example has been explained above where only one resource block is reserved, in one frame, for X2 data communication, but as shown in FIG. 9, a plurality of resource blocks may also be reserved, in one frame, for the X2 data communication.

FIG. 9 is an explanatory diagram showing a modified example of a frame configuration of the HeNodeB 30A. As shown in FIG. 9, the HeNodeB 30A may reserve, for X2 data communication, a plurality of resource blocks, in subframe #4, to which X2 data may possibly be transmitted from another HeNodeB 30.

Figure 10:
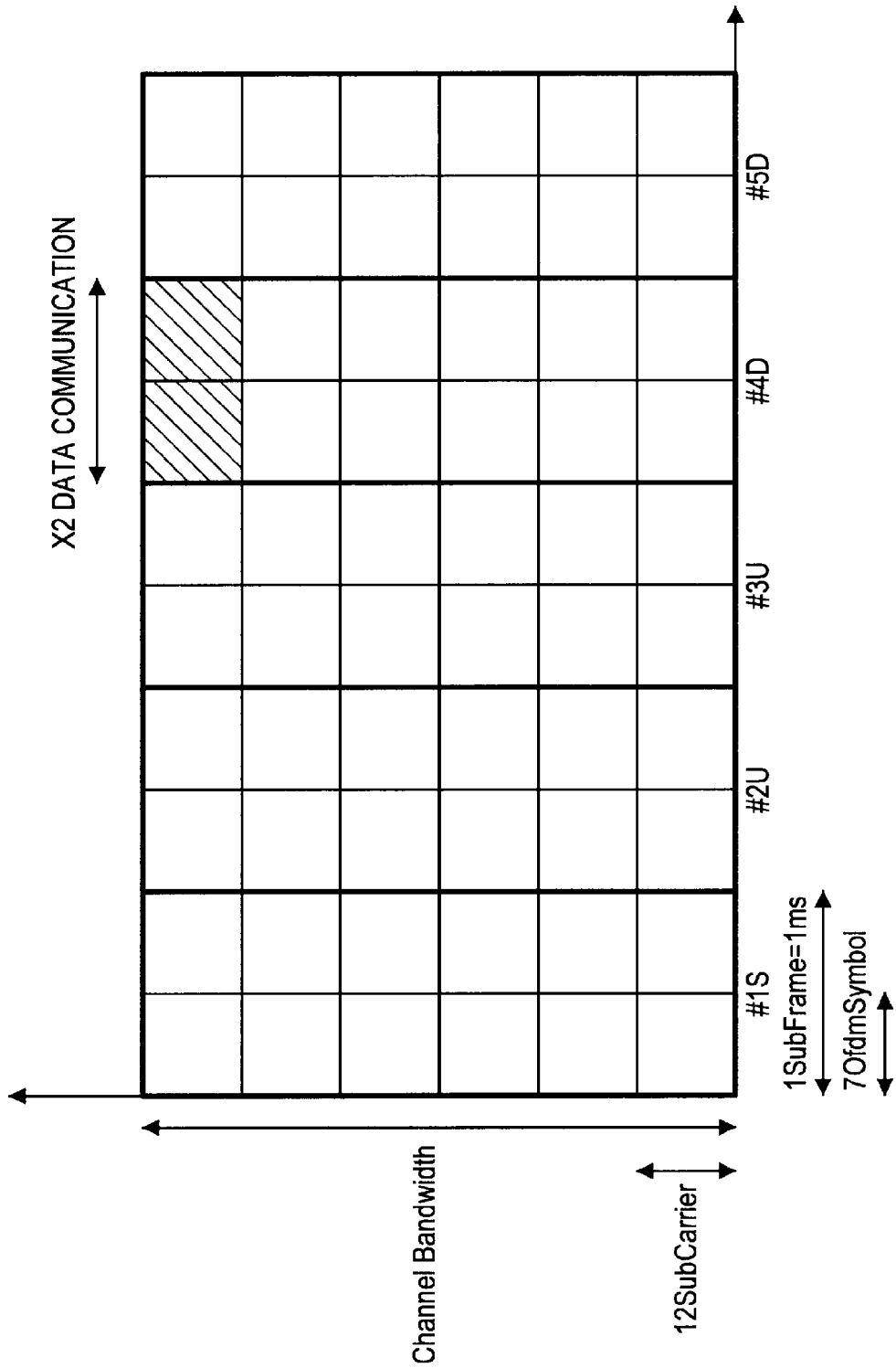
FIG. 10 is an explanatory diagram showing a resource block for transmitting X2 data.

In this case, the HeNodeB 30B may transmit X2 data by using, according to the data amount of X2 data, some of the plurality of resource blocks reserved by the HeNodeB 30A as shown in FIG. 10. Additionally, the HeNodeB 30B can also transmit the X2 data by using all of the plurality of resource blocks reserved by the HeNodeB 30A.

Modified Example 2

Furthermore, an example has been explained above where the HeNodeB 30 that transmits the X2 data changes only subframe #4 to downlink use, but the embodiment is not limited to such an example. For example, the HeNodeB 30 that transmits the X2 data may change subframes #3 and #4 to downlink use by moving boundary b2 shown in FIG. 5 to the beginning of subframe #3. Furthermore, the HeNodeB 30 that transmits the X2 data may change subframes #2 to #4 to downlink use by moving boundary b2 shown in FIG. 5 to the beginning of subframe #2.

Figure 11:
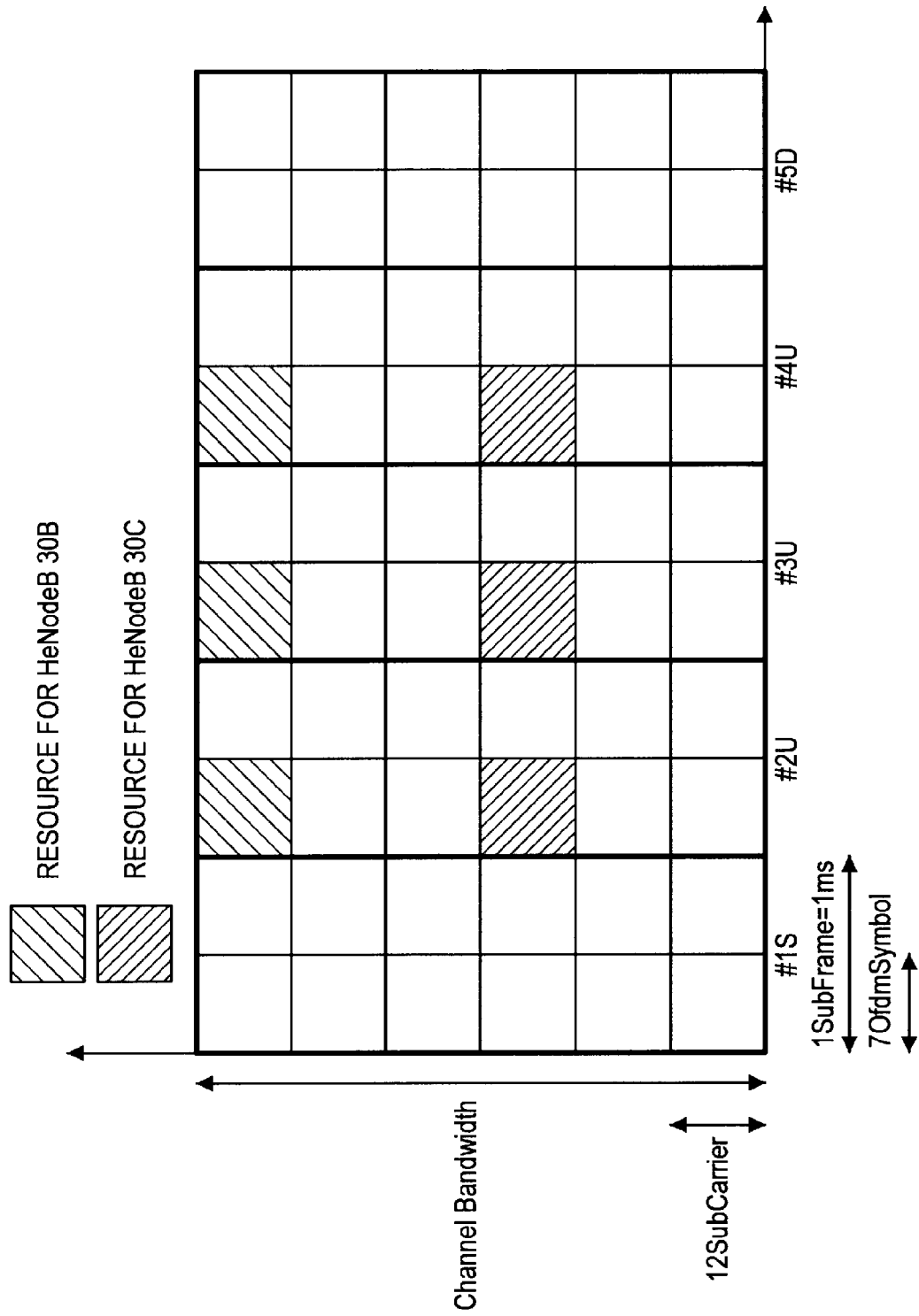
FIG. 11 is an explanatory diagram showing a modified example of a frame configuration of the HeNodeB.

In this case, as shown in FIG. 11, the HeNodeB 30 has resource blocks in subframes #2 to #4 reserved for X2 data communication because X2 data may possibly be transmitted in subframes #2 to #4 from another HeNodeB 30.

FIG. 11 is an explanatory diagram showing a modified example of a frame configuration of the HeNodeB 30A. As shown in FIG. 11, resource blocks in subframes #2 to #4 to which X2 data may possibly be transmitted from another HeNodeB 30 may be reserved by the HeNodeB 30A for X2 data communication. In this case, the HeNodeB 30B transmits X2 data by using the resource blocks in, for example, subframes #3 and #4 reserved by the HeNodeB 30A as communication resources for X2 data. Additionally, the HeNodeB 30B can also transmit X2 data by using the resource blocks in subframes #2 to #4 reserved by the HeNodeB 30A as the communication resources for X2 data.

<3-2. Operation of HeNodeB>

In the foregoing, the configuration of the HeNodeB 30 according to the first embodiment has been described. Subsequently, an operation of the HeNodeB 30 according to the first embodiment will be described.

Figure 12:
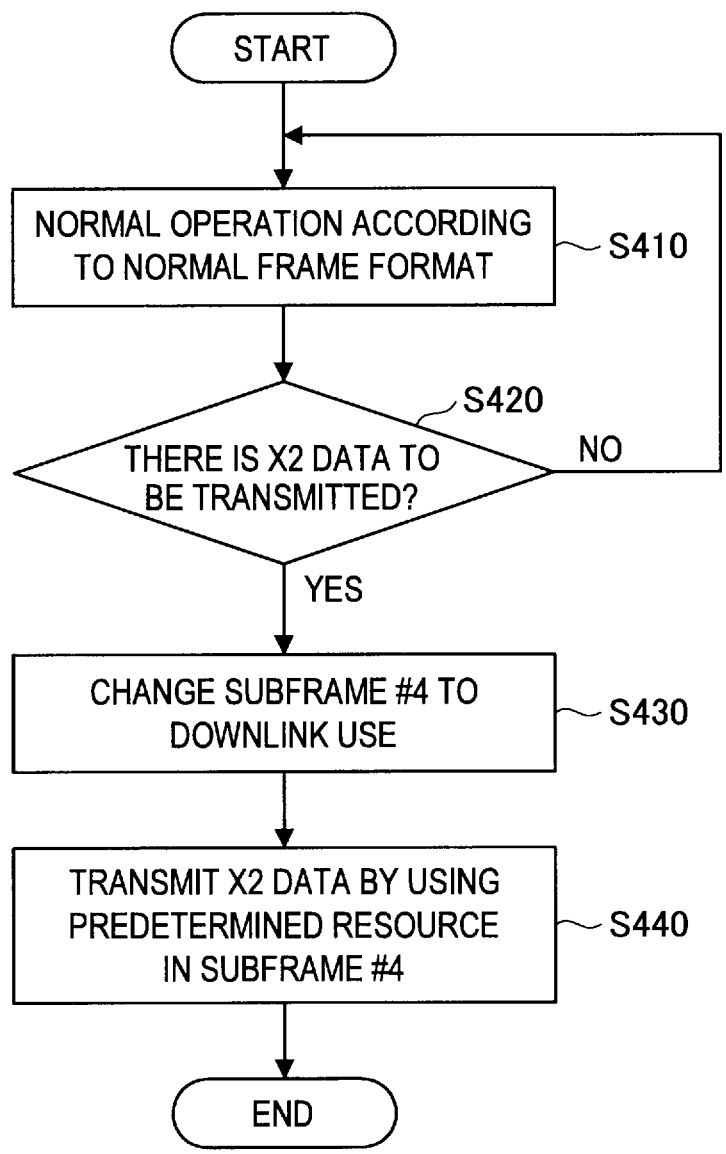
FIG. 12 is a flow chart showing an operation of the HeNodeB according to the first embodiment.

FIG. 12 is a flow chart showing an operation of the HeNodeB 30 according to the first embodiment. First, at the time of normal operation of performing communication with the user equipment 20 according to a normal frame format (S410), the scheduler 340 of the HeNodeB 30 decides whether there is X2 data to be transmitted to another HeNodeB 30 or not (S420).

Then, in the case there is X2 data to be transmitted to another HeNodeB 30, the scheduler 340 of the HeNodeB 30 changes subframe #4 to a subframe for downlink by moving boundary b2 from uplink to downlink in a forward direction (S430). Then, the wireless communication unit 310 of the HeNodeB 30 transmits the X2 data to the other HeNodeB 30 by using a predetermined resource in subframe #4 (S440).

According to such a configuration, a pseudo X2 interface can be created between the HeNodeBs 30, and thus the HeNodeBs 30 are enabled to directly communicate information for ICIC, information for handover, and the like.

<3-3. Supplement to First Embodiment>

Additionally, an example has been explained above where the HeNodeB 30 that transmits the X2 data changes a predetermined subframe for uplink use to downlink use, but the first embodiment is not limited to such an example. For example, as will be described with reference to FIG. 13, the HeNodeB 30 that receives the X2 data may change a predetermined subframe from downlink use to uplink use.

Figure 13:
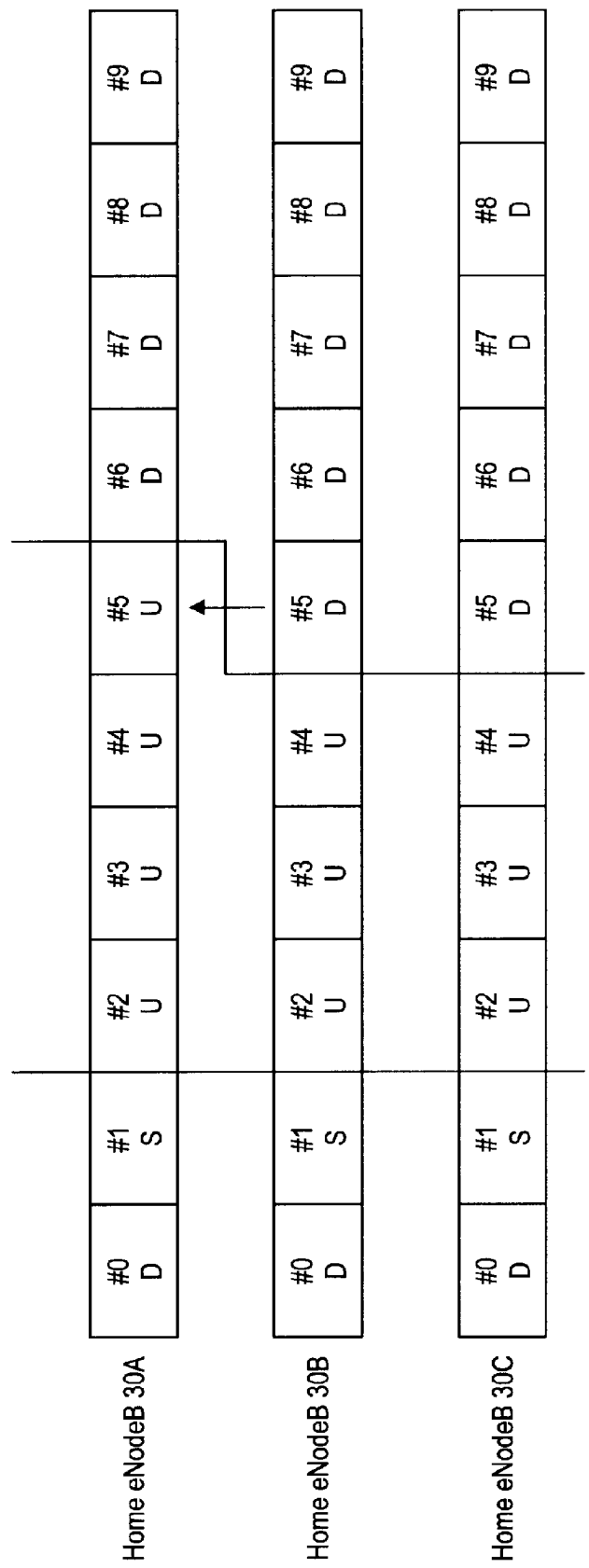
FIG. 13 is an explanatory diagram showing a modified example of a configuration of a TDD frame.

FIG. 13 is an explanatory diagram showing a modified example of a configuration of the TDD frame. As shown in FIG. 13, in the case the HeNodeB 30A is to receive X2 data from the HeNodeB 30B, the HeNodeB 30A changes subframe #5 to a subframe for uplink by moving boundary b2 shown in FIG. 5 in a backward direction along the time axis. According to such a configuration, the HeNodeB 30A is enabled to receive the X2 data transmitted from the HeNodeB 30 in subframe #5.

Additionally, as has been described in "3-1. Configuration of HeNodeB," each HeNodeB 30 may reserve, for X2 data communication, a plurality of resource blocks in subframe #5 or may reserve, for the X2 data communication, resource blocks in subframes #5 to #7.

<4. Second Embodiment>

In the foregoing, the first embodiment has been described. Subsequently, the second embodiment will be described. Whereas the first embodiment has a configuration where base stations such as the HeNodeBs 30 wirelessly and directly communicate with each other, the second embodiment has a configuration where the user equipments 20 wirelessly and directly communicate with each other.

<4-1. Configuration of User Equipment>

Figure 14:
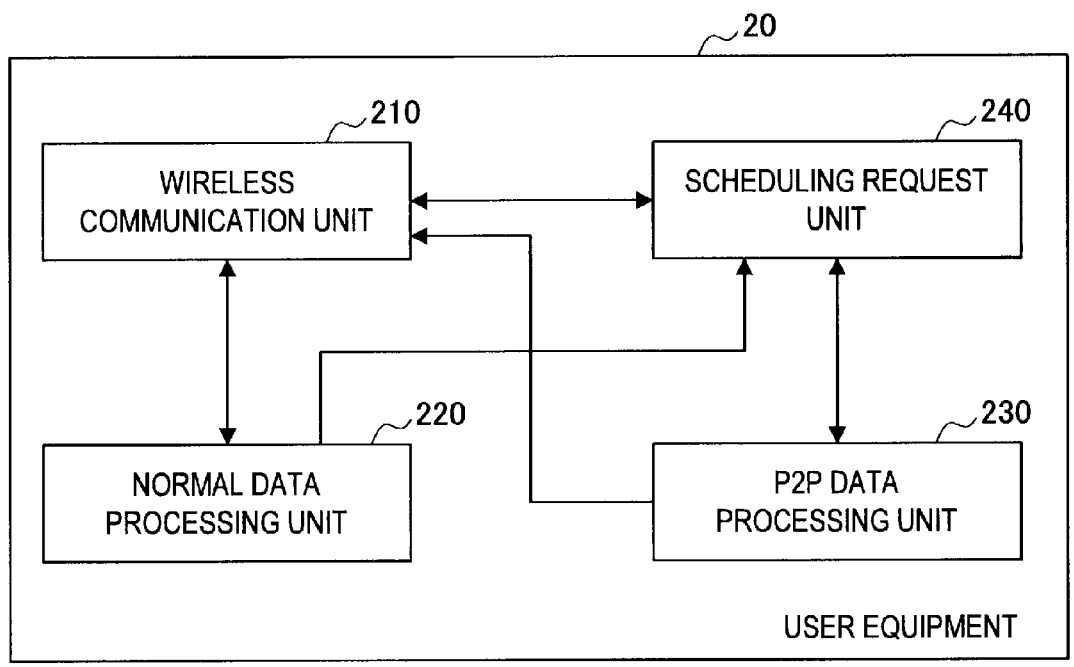
FIG. 14 is an explanatory diagram showing a configuration of a user equipment according to a second embodiment.

FIG. 14 is an explanatory diagram showing a configuration of the user equipment 20 according to the second embodiment. As shown in FIG. 14, the user equipment 20 includes a wireless communication unit 210, a normal data processing unit 220, a P2P data processing unit 230, and a scheduling request unit 240.

The wireless communication unit 210 has a function as a reception unit for receiving a control signal and data from the HeNodeB 30, and a function as a transmission unit for transmitting a control signal and data to the HeNodeB 30. Furthermore, the wireless communication unit 210 according to the embodiment exchanges P2P (Point to Point) data with another user equipment 20. Additionally, as the P2P data, various types of data may be assumed, such as voice data, audio data such as music, a lecture, a radio program, or the like, image data such as a motion picture, a television program, a video program, a photograph, a document, a painting, a diagram, or the like, a game, software, control data, or the like.

The normal data processing unit 220 processes communication data of the HeNodeB 30. The P2P data processing unit 230 performs collection of P2P data to be exchanged with another user equipment 20, processing based on P2P data obtained from another user equipment 20, and the like.

In the case of transmitting P2P data to another user equipment 20, the scheduling request unit 240 requests the HeNodeB 30 for change of scheduling for transmission of the P2P data. Here, as a difference to the first embodiment, uplink corresponds to reception for the HeNodeB 30, but uplink corresponds to transmission for the user equipment 20. Similarly, downlink corresponds to transmission for the HeNodeB 30, but downlink corresponds to reception for the user equipment 20. Taking this point into account, the HeNodeB 30 performs scheduling as shown in FIG. 15, and notifies the user equipment 20 of the scheduling result.

Figure 15:
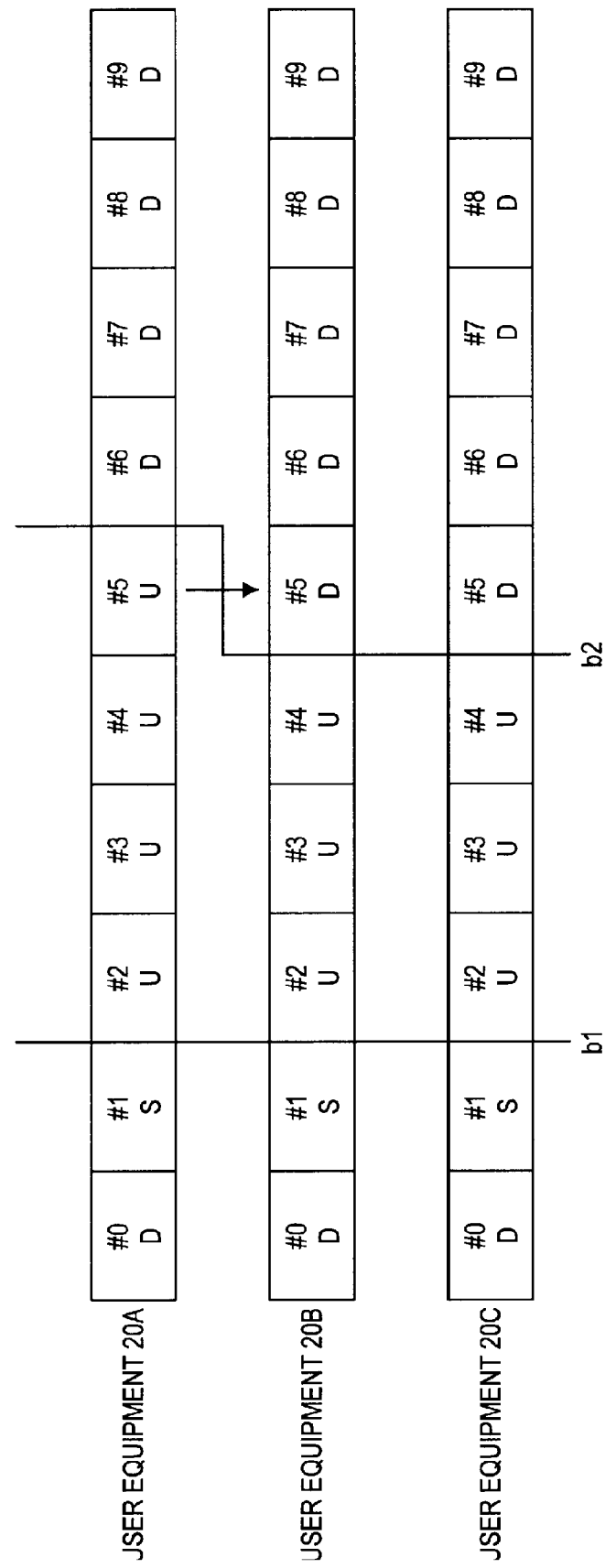
FIG. 15 is an explanatory diagram showing example configurations of TDD frames according to the second embodiment.

FIG. 15 is an explanatory diagram showing example configurations of TDD frames according to the second embodiment. In the case of the user equipment 20A transmitting P2P data, the HeNodeB 30 changes subframe #5 to uplink use by moving boundary b2, of the user equipment 20A, from uplink to downlink in a backward direction along the time axis.

Furthermore, each user equipment including the user equipment 20B reserves a resource block for P2P data communication in subframe #5 to which P2P data may possibly be transmitted from another user equipment 20. This enables the user equipment 20A to wirelessly transmit P2P data in subframe #5 and the user equipment 20B to receive the P2P data transmitted from the user equipment 20A in subframe #5.

Additionally, an example has been explained above where the user equipment 20 that transmits P2P data transmits a change request for scheduling to the HeNodeB 30, thereby preventing transmission from colliding with that of the HeNodeB 30, but the second embodiment is not limited to such an example. For example, in the case there is P2P data to be transmitted, the user equipment 20 may change the scheduling. According to such a configuration, it is conceivable that uplink transmission from the user equipment 20 and downlink transmission from the HeNodeB 30 collide with each other, but P2P data can be transmitted at an early point.

<4-2. Operation of User Equipment>

In the foregoing, the configuration of the user equipment 20 according to the second embodiment has been described. Subsequently, an operation of the user equipment 20 according to the second embodiment will be described with reference to FIG. 16.

Figure 16:
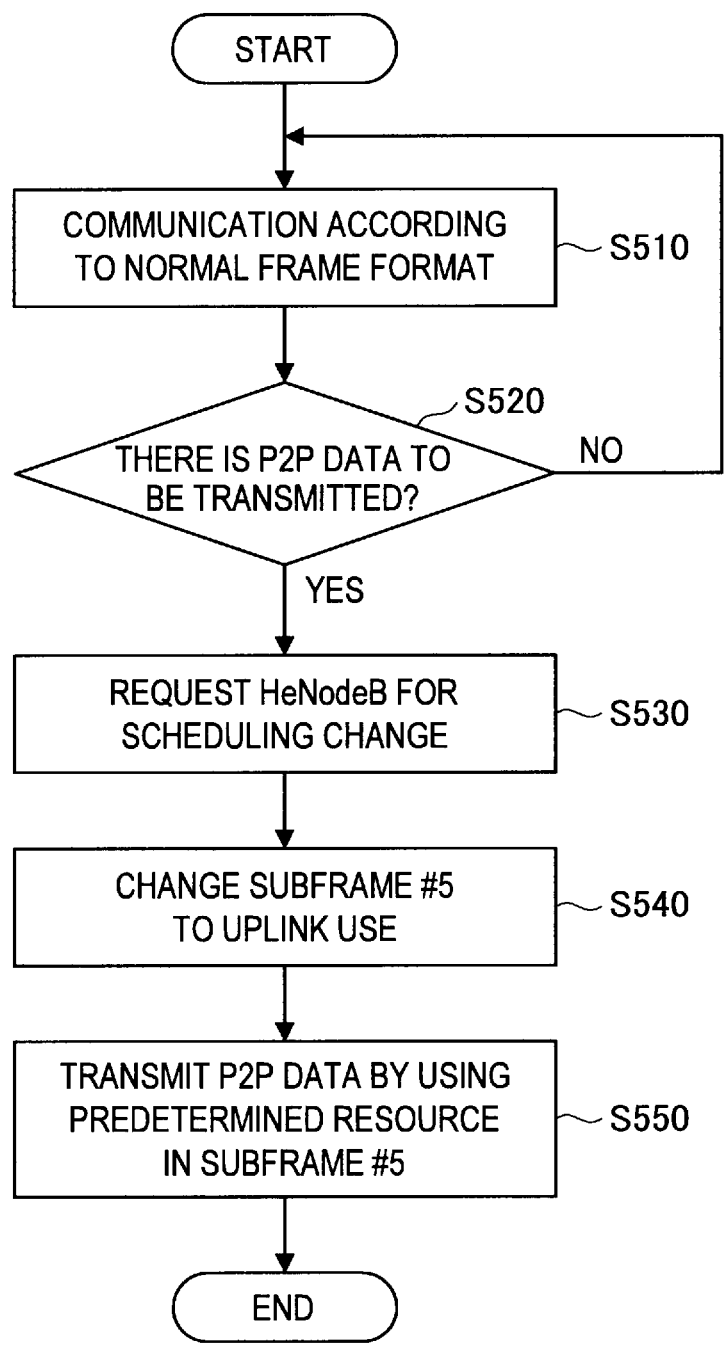
FIG. 16 is a flow chart showing an operation of the user equipment according to the second embodiment.

FIG. 16 is a flow chart showing an operation of the user equipment 20 according to the second embodiment. First, at the time of normal operation of performing communication with the HeNodeB 30 according to a normal frame format (S510), the user equipment 20 decides whether there is P2P data to be transmitted to another user equipment 20 or not (S520).

Then, in the case there is P2P data to be transmitted to another user equipment 20, the scheduling request unit 240 of the user equipment 20 requests the HeNodeB 30 for change of scheduling for transmission of the P2P data (S530). Then, the user equipment 20 receives scheduling information which has been changed by the HeNodeB 30, and changes subframe #5 to a subframe for uplink based on this scheduling information (S540). Then, the wireless communication unit 210 of the user equipment 20 transmits the P2P data to another user equipment 20 by using a predetermined resource in subframe #5 (S550).

According to such a configuration, the user equipment 20 can directly communicate with another user equipment 20 according to a 4G TDD frame.

<5. Third Embodiment>

Subsequently, before giving an explanation of a third embodiment, the point of the third embodiment will be described with reference to FIG. 17.

Circumstances Leading to Third Embodiment

FIG. 17 is an explanatory diagram showing a configuration of a subframe of a TDD frame according to the first embodiment. The HeNodeB 30B can transmit in subframe #4 which is originally for uplink use so as to provide downlink user data for the user equipment 20, as shown in FIG. 17, but can also use the same for an X2 interface which is in communication with another HeNodeB 30, as shown. Additionally, each subframe is formed from a PDCCH and a PDSCH, as shown in FIG. 17.

Here, as an operation common to LTE UE terminals, the user equipment 20 has to receive a PDCCH, which is control information, even in the case of not receiving a PDSCH in subframe #4 for downlink. However, transmitting the PDCCH to the user equipment 20 even when the HeNodeB 30B wants to use the entire subframe #4 as an X2 interface is very inefficient for both the HeNodeB 30B and the user equipment 20.

Accordingly, the third embodiment has come to be made from the standpoint of the circumstances described above. According to the third embodiment, efficient operation can be realized by applying a MBSFN subframe to a subframe of the first embodiment for X2 interface. In the following, this third embodiment will be described in detail.

(Explanation on Third Embodiment)

A MBSFN (Multicast/Broadcast Single Frequency Network) subframe is a subframe for broadcasting, and is a subframe that is received by only the user equipment 20 which has determined its reception.

As shown in FIG. 18, the HeNodeB 30 according to the third embodiment makes the user equipment 20 identify a subframe for X2 interface as the MBSFN subframe described above. This allows the user equipment 20 to not receive at all subframe #4 for X2 interface from the HeNodeB 30B, for example. Thus, the HeNodeB 30B is enabled to perform, using its own format, communication for X2 interface over the entire transmission portions of the PDCCH and the PDSCH of subframe #4. The amount of data that can be transmitted/received and latency are important with respect to the X2 interface, and thus it is extremely effective to set the MBSFN subframe to a subframe for X2 interface.

A setting method for the MBSFN subframe will be described here. Normally, a base station (eNodeB, HeNodeB, or the like) transmits system information over a BCH (broadcast channel), and this system information notifies the position of the MBSFN subframe, which in the illustrated example is subframe #4. Therefore, the base station can make the user equipment 20 identify in advance a desired subframe as the MBSFN subframe, by updating this system information.

Additionally, the system information indicating the position of the MBSFN subframe is transmitted in a subframe for downlink among subframes #0 to #9 shown in FIG. 6 or the like. More precisely, it is described in the written standards that information indicating the position of the MBSFN subframe is transmitted by a MIB (Master Information Block) and SIB2 of a SIB (System Information Block), the MIB and the SIB forming the system information. In which subframe the SIB2 is to be included is not specifically determined, and can be changed according to the situation.

<6. Summary>

As has been described above, according to the first embodiment, a pseudo X2 interface can be created between the HeNodeBs 30, and thus the HeNodeBs 30 can directly communicate with each other information for ICIC, information for handover, or the like. Also, according to the second embodiment, the user equipments 20 can directly communicate with each other.

It should be understood by those skilled in the art that various modifications, combinations, sub-combinations and alterations may occur depending on design requirements and other factors insofar as they are within the scope of the appended claims or the equivalents thereof.

For example, the steps of the processing of the user equipment 20 and the HeNodeB 30 according to the present specification do not necessarily have to be processed chronologically according to the order described as the flow chart. For example, the steps of the processing of the user equipment 20 and the HeNodeB 30 can also be processed in an order different from that described as the flow chart or may be processed in parallel.

Furthermore, a computer program for causing hardware, such as a CPU, a ROM, or a RAM, embedded in the user equipment 20 or the HeNodeB 30 to realize an equivalent function as each element of the user equipment 20 or the HeNodeB 30 described above can also be created. Furthermore, a storage medium storing the computer program is also provided.

REFERENCE SIGNS LIST

1 Wireless communication system
10 eNodeB
12 MME
14 S-GW
20 User equipment

30 HeNodeB
34 HeNodeB-GW
210, 310 Wireless communication unit
220, 320 Normal data processing unit
230 P2P data processing unit
240 Scheduling request unit
330 X2 data processing unit
340 Scheduler

The invention claimed is:

1. A two-way wireless communication node comprising:
a transceiver configured to communicate with a user equipment but not another two-way wireless communication node using uplink subframes and downlink subframes according to a predetermined frame format that uses a time division arrangement; and
a processor configured to change a status of a subframe in said predetermined frame format to enable direct communication with said other two-way wireless communication node by setting a subframe of said two-way wireless communication node to downlink use in an event a same subframe of said other two-way wireless communication node is set to uplink use.

2. The two-way wireless communication node of claim 1, wherein said processor comprises a scheduler that changes said status of said subframe of said two-way wireless communication node while retaining said predetermined frame format used by said other two-way wireless communication node.

3. The two-way wireless communication node of claim 1, wherein said processor comprises a scheduler that changes said status of said subframe of said two-way wireless communication node by moving a boundary between uplink subframes and downlink subframes.

4. The two-way wireless communication node of claim 1, wherein said subframe set to downlink use is a subframe that directly follows in time another subframe set to uplink use, which has a same status as originally assigned in said predetermined frame format.

5. The two-way wireless communication node of claim 2, wherein said scheduler determines whether there is data to be sent through an X2 interface;
and wherein said other two-way wireless communication node reserves at least one resource block carrying a subcarrier multiplexing symbol in said subframe having said changed status.

6. The two-way wireless communication node of claim 5, wherein said processor changes said status of said subframe when said scheduler determines that there is data to be sent through said X2 interface; and
said transceiver transmits, through the X2 interface, said data in said at least one resource block of said subframe.

7. The two-way wireless communication node of claim 1, wherein said subframe includes information regarding base station interference coordination.

8. The two-way wireless communication node of claim 1, wherein said processor changes said status of said subframe to be different than a status for a corresponding subframe of a third two-way wireless communication node.

9. The two-way wireless communication node of claim 1, wherein the user equipment designates said subframe of said two-way wireless communication node as a Multicast/Broadcast Single Frequency Network subframe.

10. The two-way wireless communication node of claim 3, wherein another subframe set to downlink use is a subframe that directly follows in time said subframe set to uplink use, which has a same status as originally assigned in said predetermined frame format.

11. A method of coordinating communication via a two-way wireless communication node, comprising:
wirelessly communicating with a user equipment, but not another two-way wireless communications node using uplink subframes and downlink subframes according to a predetermined frame format that uses a time division arrangement; and
changing, by a processor, a status of a subframe in said predetermined frame format to enable direct communication with said other two-way wireless communication node by setting a subframe of said two-way wireless communication node to downlink use in an event a same subframe of said other two-way wireless communication node is set to uplink use.

12. The method of claim 11, wherein said changing includes changing said status of said subframe of said two-way wireless communication node, while retaining said predetermined frame format used by said other two-way wireless communication node.

13. The method of claim 11, wherein said changing includes changing said status of said subframe of said two-way wireless communication node by moving a boundary between uplink subframes and downlink subframes.

14. The method of claim 11, wherein said subframe set to downlink use is a subframe that directly follows in time another subframe set to uplink use, which has a same status as originally assigned in said predetermined frame format.

15. The method of claim 12, wherein another subframe set to downlink use is a subframe that directly follows in time said subframe set to uplink use, which has a same status as originally assigned in said predetermined frame format.

16. The method of claim 11, further comprising:
determining whether there is data to be sent through an X2 interface;
reserving at least one resource block carrying a subcarrier multiplexing symbol in said subframe having said changed status;
changing said status of said subframe when said scheduler determines that there is data to be sent through said X2 interface; and
transmitting, through said X2 interface, said data in said at least one resource block of said subframe.

17. The method of claim 11, wherein said subframe includes information regarding base station interference coordination.

18. The method of claim 11, wherein changing said status of said subframe includes changing said status to be consistent with a change in status for a corresponding subframe made by a third two-way wireless communication node.

19. The method of claim 11, wherein said subframe of said two-way wireless communication node is a Multicast/Broadcast Single Frequency Network subframe.

20. A non-transitory computer program storage device having instructions that when executed by a processor implement a method of coordinating communication via a two-way wireless communication node, comprising:
wirelessly communicating with a user equipment, but not another two-way wireless communication node using uplink subframes and downlink subframes according to a predetermined frame format that uses a time division arrangement; and
changing, by processor, a status of a subframe in said predetermined frame format to enable direct communication with said other two-way wireless communication node by setting a subframe of said two-way wireless communication node to downlink use in an event a same subframe of said other two-way wireless communication node is set to uplink use.

21. The non-transitory computer program storage device of claim 20, wherein said changing includes changing said status of said two-way wireless communication node while retaining a frame format used by said other two-way wireless communication node.

22. The non-transitory computer program storage device of claim 20, wherein said changing includes changing said status of said subframe of said two-way wireless communication node by moving a boundary between uplink subframes and downlink subframes.

23. The non-transitory computer program storage device of claim 20, wherein said subframe set to downlink use is a subframe that directly follows in time another subframe set to uplink use, which has a same status as originally assigned in said predetermined frame format.

24. The non-transitory computer program storage device of claim 20, wherein the method further comprises:
determining whether there is data to be sent through an X2 interface;
reserving at least one resource block carrying a subcarrier multiplexing symbol in said subframe having said changed status;
changing said status of said subframe when it is determined that there is data to be sent through said X2 interface; and
transmitting, through said X2 interface, data in said at least one resource block of said subframe.

25. The non-transitory computer program storage device of claim 20, wherein said subframe includes information regarding base station interference coordination.

26. The non-transitory computer program storage device of claim 20, wherein changing said status of said subframe includes changing said status to be consistent with a change in status for a corresponding subframe made by a third two-way wireless communication node.

27. The non-transitory computer program storage device of claim 20, wherein said subframe is a Multicast/Broadcast Single Frequency Network subframe.

* * * * *